(12) United States Patent
Zhang

(10) Patent No.: US 10,568,095 B2
(45) Date of Patent: Feb. 18, 2020

(54) METHOD AND DEVICE IN UE AND BASE STATION USED FOR WIRELESS COMMUNICATION

(71) Applicant: Shanghai Langbo Communication Technology Company Limited, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/046,440

(22) Filed: Jul. 26, 2018

(65) Prior Publication Data

US 2019/0037558 A1    Jan. 31, 2019

(30) Foreign Application Priority Data

Jul. 27, 2017 (CN) .......................... 2017 1 0622468

(51) Int. Cl.
| | | |
|---|---|---|
| *H04J 3/00* | (2006.01) | |
| *H04W 72/04* | (2009.01) | |
| *H04L 5/00* | (2006.01) | |
| *H04W 72/12* | (2009.01) | |

(52) U.S. Cl.
CPC ......... *H04W 72/0446* (2013.01); *H04L 5/003* (2013.01); *H04L 5/0048* (2013.01); *H04W 72/048* (2013.01); *H04W 72/1284* (2013.01)

(58) Field of Classification Search
CPC ......... H04W 72/0446; H04W 72/1284; H04W 72/048; H04L 5/0048
USPC .......................................................... 370/336
See application file for complete search history.

(56) References Cited

U.S. PATENT DOCUMENTS

| | | | |
|---|---|---|---|
| 8,503,408 B2* | 8/2013 | Seo ....................... | H04B 7/0634 370/336 |
| 2003/0064743 A1* | 4/2003 | Chen ..................... | H04W 52/12 455/522 |
| 2006/0209874 A1* | 9/2006 | Nagata ............... | H04W 74/0808 370/445 |
| 2013/0021926 A1* | 1/2013 | Geirhofer ............ | H04L 5/0048 370/252 |
| 2018/0270689 A1* | 9/2018 | Akkarakaran ......... | H04B 7/088 |

* cited by examiner

*Primary Examiner* — Mang Hang Yeung
(74) *Attorney, Agent, or Firm* — Maschoff Brennan

(57) ABSTRACT

The present disclosure provides a method and a device in a User Equipment (UE) and a base station used for wireless communication. The UE transmits K bit blocks, wherein if the number of idle bits on a first physical layer channel is not less than Q before the K bit blocks are placed on the first physical layer channel, the K bit blocks are transmitted on the first physical layer channel; otherwise, the K bit blocks are transmitted on K physical layer channels respectively; the K physical layer channels belong to K serving cells respectively, or, the K physical layer channels belong to one serving cell and time-domain resources occupied by any two of the K physical layer channels are orthogonal; the K bit blocks together are used for determining first information.

20 Claims, 10 Drawing Sheets

METHOD AND DEVICE IN UE AND BASE STATION USED FOR WIRELESS COMMUNICATION

CROSS REFERENCE TO RELATED APPLICATION

This application claims the priority benefit of Chinese Patent Application Ser. No. 201710622468.8, filed Jul. 27, 2017, the full disclosure of which is incorporated herein by reference.

BACKGROUND

Technical Field

The present disclosure relates to transmission schemes of radio signals in wireless communication systems, and in particular to a method and a device for a User Equipment (UE) to autonomously determine transmission of information.

Related Art

Massive Multi-Input Multi-Output (MIMO) becomes a research hotspot of next-generation mobile communications. In the massive MIMO, multiple antennas experience beamforming to form a relatively narrow beam which points to a particular direction to improve the quality of communication.

In 3rd Generation Partner Project (3GPP) New Radio discussion, there is some company proposing that a UE should conduct a measurement on a service beam during the communication process and that, when the quality of the service beam is found degraded, a Physical Uplink Control Channel (PUCCH) should be used by the UE to transmit a beam recovery request to a base station, which then changes the service beam.

SUMMARY

The inventor finds through researches that the beam recovery request is a kind of information the UE determines autonomously to transmit. Using a dedicated PUCCH to transmit the information the UE determines autonomously to transmit and allocating periodic time-frequency resources for the information would result in complexity of system, untimeliness of request reporting, and problems of air interface resource overheads.

In view of the above problems, the present disclosure provides a solution. It should be noted that the embodiments of the present disclosure and the characteristics in the embodiments may be mutually combined if no conflict is caused. For example, the embodiments of the UE of the present disclosure and the characteristics in the embodiments may be applied to the base station, and vice versa.

The present disclosure provides a method in a UE for wireless communication. The method includes the following step of:

transmitting K bit blocks.

Herein, if the number of idle bits on a first physical layer channel is not less than Q before the K bit blocks are placed on the first physical layer channel, the K bit blocks are transmitted on the first physical layer channel; otherwise, the K bit blocks are transmitted on K physical layer channels respectively; the K physical layer channels belong to K serving cells respectively, or, the K physical layer channels belong to one serving cell and time-domain resources occupied by any two of the K physical layer channels are orthogonal; the K bit blocks together are used for determining first information; K is a positive integer greater than 1, and Q is equal to the total number of the bits included in the K bit blocks.

In one embodiment, the above method is advantageous in that: the UE determines autonomously a scheme for information transmission according to the idle bits on the PUCCH, thereby reducing the latency of transmission and improving the efficiency of transmission.

In one embodiment, the first physical layer channel is configured by a base station.

In one embodiment, the K physical layer channels are configured by a base station.

In one embodiment, the transmission of the K bit blocks is determined by the UE autonomously.

In one embodiment, the first physical layer channel is used not only for transmitting the K bit blocks, but also for transmitting information bits other than the K bit blocks.

In one embodiment, the K physical layer channels are used not only for transmitting the K bit blocks, but also for transmitting information bits other than the K bit blocks.

In one embodiment, the first physical layer channel is a PUCCH.

In one embodiment, the K physical layer channels are K PUCCHs respectively.

In one embodiment, the first physical layer channel is a short PUCCH (sPUCCH).

In one embodiment, the K physical layer channels are K sPUCCHs respectively.

In one embodiment, the transmission of the K bit blocks is determined by the UE autonomously.

In one embodiment, the transmission of the K bit blocks is not triggered by a serving cell.

In one embodiment, the UE determines whether transmitting the K bit blocks, by receiving a radio signal.

In one embodiment, the UE determines whether transmitting the K bit blocks, by downlink measurement.

In one embodiment, information bits and idle bits are transmitted on the first physical layer channel, wherein the idle bits refer to the bits not carrying information.

In one embodiment, before the K bit blocks are placed on the first physical layer channel, the number of idle bits on the first physical layer channel is L, wherein L is a positive integer not less than Q; after the K bit blocks are placed on the first physical layer channel, the number of idle bits on the first physical layer channel is L-Q.

In one embodiment, the physical layer channel is a physical layer uplink control channel, that is, an uplink physical layer channel capable of transmitting control information only, wherein the control information includes at least one of {Scheduling Request (SR), Hybrid Automatic Repeat Request-Acknowledgement (HARQ/ACK), Precoding Matrix Indicator (PMI), Channel Quality Indicator (CQI), Rank Indicator (RI), Beam Recovery Request, CSI-RS Resource Indicator (CRI)}.

In one embodiment, the number of the idle bits in the first physical layer channel changes according to system configuration.

In one embodiment, the first physical layer channel is used for transmitting bits corresponding to a first Uplink Control Information (UCI) format. The number of information bits in the first UCI format other than those determined autonomously by the UE changes according to system configuration.

In one embodiment, there is a first system configuration, under which the number of idle bits on the first physical layer channel is less than Q before the K bit blocks are placed on the first physical layer channel; and there is a second system configuration, under which the number of idle bits on the first physical layer channel is not less than Q before the K bit blocks are placed on the first physical layer channel. The first system configuration and the second system configuration are two different system configurations.

In one embodiment, the first system configuration and the second system configuration correspond to different numbers of subcarriers respectively.

In one embodiment, the K bit blocks are used for determining a beam recovery request.

In one embodiment, the K bit blocks are used for determining a scheduling request.

In one embodiment, the K bit blocks are used for determining a beam recovery request and a scheduling request.

In one embodiment, the K bit blocks belong to one UCI.

In one embodiment, the K bit blocks correspond to one UCI format.

In one embodiment, the K bit blocks correspond to K bit fields in one UCI format respectively.

In one embodiment, the first physical layer channel is scheduled by a serving cell for the reporting of information other than the K bit blocks.

In one embodiment, the K physical layer channels are scheduled by a serving cell for the reporting of information other than the K bit blocks.

In one embodiment, the first physical layer channel is one of the K physical layer channels that has the maximum number of idle bits.

In one embodiment, the position of the first one in the K physical layer channels is fixed.

In one embodiment, the method further includes the following step of: receiving a downlink signaling, wherein the downlink signaling is used for determining the first physical layer channel from the K physical layer channels.

In one embodiment, the number of idle bits in any one of the K physical layer channels is less than or equal to the number of idle bits in the first physical layer channel.

In one embodiment, the first physical layer channel is one of the K physical layer channels.

In one embodiment, the K serving cells are on K different subcarriers respectively.

In one embodiment, the K serving cells are K virtual cells respectively.

In one embodiment, the K serving cells correspond to K cell-specific scrambling sequence groups respectively.

In one embodiment, the K serving cells correspond to K transmitting beams respectively in different directions.

In one embodiment, the K serving cells correspond to K beam pairs respectively in different directions.

In one embodiment, a time-domain resource occupied by the first one in the K physical layer channels in time domain is used for determining the transmitting start time of the K physical layer channels.

In one embodiment, a time-domain resource occupied by the last physical layer channel in the K physical layer channels in time domain is used for determining the transmitting end time of the first information.

In one embodiment, a time-domain resource occupied by the first one in the K physical layer channels in time domain is used for determining time-domain resources occupied by the K physical layer channels.

In one embodiment, Q is used for determining time-domain resources occupied by the K physical layer channels.

In one embodiment, the number of idle bits on the K physical layer channels, before the K bit blocks are placed on the K physical layer channels, is used for determining K.

In one embodiment, K is equal to 2.

In one embodiment, the first physical layer channel is the first one in the K physical layer channels in time domain.

In one embodiment, a time-domain resource occupied by the second one in the K physical layer channels in time domain is determined by the time-domain resource occupied by the first physical layer channel in the physical layer channels in time domain.

In one embodiment, information bits in the first one in the K physical layer channels in time domain includes bits unrelated to the first information.

In one embodiment, information bits in the second one in the K physical layer channels in time domain are related to the first information.

In one embodiment, the first information is used for determining a beam recovery request.

In one embodiment, the K bit blocks are used for determining a scheduling request.

In one embodiment, the K bit blocks are used for determining a beam recovery request and a scheduling request.

In one embodiment, the first information is used for determining subsequent multi-antenna related transmitting.

In one embodiment, the first information is related to the subsequent multi-antenna related receiving of the UE.

In one embodiment, the first information is used for determining an analog beamforming vector subsequently used for transmitting a Physical Downlink Control Channel (PDCCH).

In one embodiment, the first information is related to an analog beamforming vector subsequently used for receiving a PDCCH.

In one embodiment, the UE assumes that an analog beam subsequently used for transmitting a PDCCH is determined by the first information, and the UE receives a subsequent PDCCH using a receiving beam corresponding to the analog beam used for transmitting the PDCCH.

In one embodiment, the first information is used for determining a reference signal, and a transmitting beam used for transmitting the reference signal is used for transmitting a subsequent PDCCH.

In one embodiment, a receiving beam used for receiving the reference signal is used for receiving a subsequent PDCCH.

In one embodiment, a reference signal used for demodulating the subsequent PDCCH is spatially related to the above reference signal.

In one embodiment, the being spatially related refers to being Quasi Co-located (QCL).

In one embodiment, the K bit blocks include information bits only.

In one embodiment, the K bit blocks are transmitted after subjected to channel coding.

In one embodiment, the physical layer channel is a coding channel.

According to one aspect of the present disclosure, the method includes the following step of:
receiving a target radio signal.
Herein, a measurement for the target radio signal is used for triggering the transmission of the K bit blocks.

In one embodiment, the above method is advantageous in that: the UE determines autonomously the transmission of the K bit blocks and reflects the transmission condition in time.

In one embodiment, the result of the channel measurement is less than a target threshold.

In one embodiment, the target radio signal is used for conducting a channel measurement of a target channel.

In one embodiment, the target channel is a PDCCH, that is, a downlink physical layer channel used for transmitting control information only.

In one embodiment, the target channel is a Physical Downlink Shared Channel (PDSCH).

In one embodiment, the result of the channel measurement includes a Signal-to-Interference-and-Noise Ratio (SINR).

In one embodiment, the result of the channel measurement includes a Signal-to-Noise Ratio (SNR).

In one embodiment, the target threshold is in unit of dB.

In one embodiment, the result of the channel measurement includes a Reference Signal Received Power (RSRP).

In one embodiment, the target threshold is in unit of dBm.

In one embodiment, the result of the channel measurement includes a Block Error Rate (BLER) corresponding to the target channel.

In one embodiment, the target radio signal is a reference signal.

In one embodiment, the target radio signal is a Demodulation Reference Signal (DMRS).

In one embodiment, the target radio signal is a Channel State Information Reference Signal (CSI-RS).

In one embodiment, the target radio signal is a Synchronization Signal (SS).

In one embodiment, the target radio signal is a CSI-RS, and the channel measurement is a BLER calculation after the received CSI-RS is mapped to the target channel.

According to one aspect of the present disclosure, the method is characterized in that: the K bit blocks are only for K1 serving cells, wherein K1 is a positive integer less than K.

In one embodiment, the above method is advantageous in that: transmitting resources are sufficiently used and reporting latency is reduced.

In one embodiment, K physical layer channels are used for transmitting the K bit blocks respectively, and the K physical layer channels belong to K serving cells respectively.

In one embodiment, the K serving cells are on K subcarriers respectively.

In one embodiment, the K serving cells correspond to K transmitting beams in different directions.

In one embodiment, K is greater than 1, and K1 is equal to 1.

In one embodiment, K is equal to 2, and K1 is equal to 1.

In one embodiment, the first information is only for the K1 serving cells.

In one embodiment, the target radio signal is received on the K1 serving cells only.

According to one aspect of the present disclosure, the method is characterized in that: a first bit block and a second bit block are used for generating a first radio signal transmitted on a second physical layer channel; the second physical layer channel is one of the K physical layer channels; the second bit block is one of the K bit blocks; and the first bit block is unrelated to the first information.

In one embodiment, the above method is advantageous in that: the system design is simplified, the utilization of the physical layer channel is improved, and the transmitting opportunity of reporting request is increased.

In one embodiment, the second physical layer channel is a PUCCH.

In one embodiment, the second physical layer channel is one PUCCH, that is, an uplink physical layer channel capable of transmitting control information only, wherein the control information includes at least one of {Scheduling Request (SR), Hybrid Automatic Repeat Request-Acknowledgement (HARQ/ACK), Precoding Matrix Indicator (PMI), Channel Quality Indicator (CQI), Rank Indicator (RI), Beam Recovery Request, CSI-RS Resource Indicator (CRI)}.

In one embodiment, the second bit block is used for determining a scheduling request or a beam recovery request.

In one embodiment, the first bit block consists of X1 bits, the second bit block consists of X2 bits, and the first channel can contain X3 bits at most; the sum of X1 and Q is greater than X4; X1 is a positive integer less than X3, X3 is a positive integer greater than 1, and X2 is a positive integer less than Q.

In one embodiment, the sum of X1 and X2 is equal to X4

In one embodiment, the sum of X1 and X2 is less than X4

In one embodiment, the receiver for the K bit blocks and the UE have the same understanding of X1.

In one embodiment, the first bit block and the second bit block are in one same UCI.

In one embodiment, the first bit block and the second bit block are different fields in one same UCI format.

In one embodiment, the first bit block and the second bit block constitute an input of a channel coding module.

In one embodiment, the first bit block, the second bit block and the idle bits constitute an input of a channel coding module.

In one embodiment, the idle bits are padding bits.

According to one aspect of the present disclosure, the method further includes the following step of:

receiving a first signaling.

Herein, the first signaling is used for determining P reference signal configurations, and the first information is used for determining a first reference signal configuration from the P reference signal configurations, wherein P is a positive integer greater than 1.

In one embodiment, the above method is advantageous in indicating beam switching.

In one embodiment, the first signaling is a Radio Resource Control (RRC) layer signaling.

In one embodiment, the first signaling is a Medium Access Control (MAC) layer signaling.

In one embodiment, the first signaling is a physical layer signaling.

In one embodiment, the first signaling explicitly indicates the P reference signal configurations.

In one embodiment, the first signaling implicitly indicates the P reference signal configurations.

In one embodiment, one reference signal configuration indicates a positive integer number of CSI-RS antenna ports.

In one embodiment, all antenna ports indicated by one reference signal configuration correspond to an analog receiving beamforming vector of the UE.

In one embodiment, all antenna ports indicated by one reference signal configuration correspond to an analog transmitting beamforming vector of the transmitter of the first radio signal.

In one embodiment, the reference signal configuration is a CSI-RS configuration.

In one embodiment, the reference signal configuration is an SS configuration.

According to one aspect of the present disclosure, the method includes the following step of:

receiving a second radio signal.

Herein, the first information is used for determining a multi-antenna related transmitting of the second radio signal, and the first information is related to a multi-antenna related receiving used for the second radio signal.

In one embodiment, the above method is advantageous in that feedback overhead is saved and the opportunity of the UE receiving a reply signaling is increased.

In one embodiment, the second radio signal is a response to a beam recovery request.

In one embodiment, the second radio signal is used for acknowledging the receiving of the first information.

In one embodiment, the first information explicitly indicates the multi-antenna related transmitting of the second radio signal.

In one embodiment, the first information implicitly indicates the multi-antenna related transmitting of the second radio signal.

In one embodiment, the first information is used for determining a transmitting beam used for transmitting the second radio signal.

In one embodiment, a receiving beam corresponding to the transmitting beam indicated by the first information is used for receiving the second radio signal.

In one embodiment, the first information is used for determining the first reference signal configuration.

In one embodiment, a first reference signal is transmitted on an air interface resource of the first reference signal configuration. A transmitting beam used for the first reference signal is used for transmitting the second radio signal. A receiving beam used for receiving the first reference signal is used for receiving the second radio signal.

In one embodiment, the first reference signal is a CSI-RS.

In one embodiment, the first reference signal is an SS.

In one embodiment, the reference signal configuration is a CSI-RS resource.

In one embodiment, the first information includes a CSI-RS Resource Indicator (CRI).

In one embodiment, the first information includes an SS block indicator.

In one embodiment, a reference signal used for demodulating the second radio signal is spatially related to a reference signal corresponding to the first reference signal configuration.

In one embodiment, the being spatially related refers to being QCL.

In one embodiment, the being spatially related refers to using the same beam.

In one embodiment, the being spatially related refers that channel characteristics are the same.

In one embodiment, the channel characteristics of two channels being the same refers that at least one of the Delay Spread, Doppler Spread, Doppler Shift, average of Angle of Arrival (AoA), and average of Angle of Departure (AoD) is the same.

In one embodiment, the being spatially related refers that the channel characteristics are similar.

In one embodiment, the channel characteristics of two channels being similar refers that at least one of the Delay Spread, Doppler Spread, Doppler Shift, average of Angle of Arrival (AoA), and average of Angle of Departure (AoD) is similar.

In one embodiment, the being similar refers that the difference between the same type of channel characteristics of the two channels is less than a first threshold.

In one embodiment, the first threshold is default.

In one embodiment, in time domain, the second radio signal is transmitted after the K bit blocks.

According to one aspect of the present disclosure, the method includes the following step of:

receiving a second signaling.

Herein, the second signaling is used for determining a first time-frequency resource set, and time-frequency resources occupied by the first physical layer channel and the K physical layer channels belong to the first time-frequency resource set.

In one embodiment, the second signaling is an RRC layer signaling.

In one embodiment, the second signaling is a MAC layer signaling.

In one embodiment, the second signaling is a physical layer signaling.

In one embodiment, the second signaling explicitly indicates the first time-frequency resource set.

In one embodiment, the second signaling implicitly indicates the first time-frequency resource set.

In one embodiment, the second signaling includes at least the former one of {one RRC layer signaling, one physical layer signaling}

The present disclosure provides a method in a base station device for wireless communication. The method includes the following step of:

receiving K bit blocks.

Herein, if the number of idle bits on a first physical layer channel is not less than Q before K bit blocks are placed on the first physical layer channel, the K bit blocks are received on the first physical layer channel; otherwise, the K bit blocks are received on K physical layer channels respectively; the K physical layer channels belong to K serving cells respectively, or, the K physical layer channels belong to one serving cell and time-domain resources occupied by any two of the K physical layer channels are orthogonal; the K bit blocks together are used for determining first information; K is a positive integer greater than 1, and Q is equal to the total number of the bits included in the K bit blocks.

According to one aspect of the present disclosure, the method includes the following step of:

transmitting a target radio signal.

Herein, a measurement for the target radio signal is used for triggering the transmission of the K bit blocks.

According to one aspect of the present disclosure, the method is characterized in that: the K bit blocks are only for K1 serving cells, wherein K1 is a positive integer less than K.

According to one aspect of the present disclosure, the method is characterized in that: a first bit block and a second bit block are used for generating a first radio signal transmitted on a second physical layer channel; the second physical layer channel is one of the K physical layer channels; the second bit block is one of the K bit blocks; and the first bit block is unrelated to the first information.

According to one aspect of the present disclosure, the method includes the following step of:

transmitting a first signaling.

Herein, the first signaling is used for determining P reference signal configurations, and the first information is used for determining a first reference signal configuration from the P reference signal configurations, wherein P is a positive integer greater than 1.

According to one aspect of the present disclosure, the method includes the following step of:

transmitting a second radio signal.

Herein, the first information is used for determining a multi-antenna related transmitting of the second radio signal, and the first information is related to a multi-antenna related receiving used for the second radio signal.

According to one aspect of the present disclosure, the method includes the following step of:

receiving a second signaling.

Herein, the second signaling is used for determining a first time-frequency resource set, and time-frequency resources occupied by the first physical layer channel and the K physical layer channels belong to the first time-frequency resource set.

The present disclosure provides a UE for wireless communication. The UE includes:

a first transceiver module, to transmit K bit blocks.

Herein, if the number of idle bits on a first physical layer channel is not less than Q before the K bit blocks are placed on the first physical layer channel, the K bit blocks are transmitted on the first physical layer channel; otherwise, the K bit blocks are transmitted on K physical layer channels respectively; the K physical layer channels belong to K serving cells respectively, or, the K physical layer channels belong to one serving cell and time-domain resources occupied by any two of the K physical layer channels are orthogonal; the K bit blocks together are used for determining first information; K is a positive integer greater than 1, and Q is equal to the total number of the bits included in the K bit blocks.

In one embodiment, the above UE is characterized in that: the first transceiver module receives a target radio signal, wherein a measurement for the target radio signal is used for triggering the transmission of the K bit blocks.

In one embodiment, the above UE is characterized in that: the K bit blocks are only for K1 serving cells, wherein K1 is a positive integer less than K.

In one embodiment, the above UE is characterized in that: a first bit block and a second bit block are used for generating a first radio signal transmitted on a second physical layer channel; the second physical layer channel is one of the K physical layer channels; the second bit block is one of the K bit blocks; and the first bit block is unrelated to the first information.

In one embodiment, the above UE is characterized in that: the first transceiver module receives a first signaling, wherein the first signaling is used for determining P reference signal configurations, and the first information is used for determining a first reference signal configuration from the P reference signal configurations, wherein P is a positive integer greater than 1.

In one embodiment, the above UE is characterized in that: the first transceiver module receives a second radio signal, wherein the first information is used for determining a multi-antenna related transmitting of the second radio signal, and the first information is related to a multi-antenna related receiving used for the second radio signal.

In one embodiment, the above UE is characterized in that: the first transceiver module receives a second signaling, wherein the second signaling is used for determining a first time-frequency resource set, and time-frequency resources occupied by the first physical layer channel and the K physical layer channels belong to the first time-frequency resource set.

The present disclosure provides a base station device for wireless communication. The base station device includes:

a second transceiver module, to receive K bit blocks.

Herein, if the number of idle bits on a first physical layer channel is not less than Q before the K bit blocks are placed on the first physical layer channel, the K bit blocks are received on the first physical layer channel; otherwise, the K bit blocks are received on K physical layer channels respectively; the K physical layer channels belong to K serving cells respectively, or, the K physical layer channels belong to one serving cell and time-domain resources occupied by any two of the K physical layer channels are orthogonal; the K bit blocks together are used for determining first information; K is a positive integer greater than 1, and Q is equal to the total number of the bits included in the K bit blocks.

In one embodiment, the above base station device is characterized in that: the second transceiver module transmits a target radio signal, wherein a measurement for the target radio signal is used for triggering the transmission of the K bit blocks.

In one embodiment, the above base station device is characterized in that: the K bit blocks are only for K1 serving cells, wherein K1 is a positive integer less than K.

In one embodiment, the above base station device is characterized in that: a first bit block and a second bit block are used for generating a first radio signal transmitted on a second physical layer channel; the second physical layer channel is one of the K physical layer channels; the second bit block is one of the K bit blocks; and the first bit block is unrelated to the first information.

In one embodiment, the above base station device is characterized in that: the second transceiver module transmits a first signaling, wherein the first signaling is used for determining P reference signal configurations, and the first information is used for determining a first reference signal configuration from the P reference signal configurations, wherein P is a positive integer greater than 1.

In one embodiment, the above base station device is characterized in that: the second transceiver module transmits a second radio signal, wherein the first information is used for determining a multi-antenna related transmitting of the second radio signal, and the first information is related to a multi-antenna related receiving used for the second radio signal.

In one embodiment, the above base station device is characterized in that: the second transceiver module transmits a second signaling, wherein the second signaling is used for determining a first time-frequency resource set, and time-frequency resources occupied by the first physical layer channel and the K physical layer channels belong to the first time-frequency resource set.

In one embodiment, compared with the prior art, the present disclosure has the following technical advantages:

the latency of transmission is reduced;

the efficiency of transmission is improved;

the utilization of the physical layer channel is improved;

the opportunity of triggering request reporting by the UE is increased; and the air interface resource overhead is controlled.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further detail in conjunction with the drawings. It should be noted that the embodiments in the present disclosure and the characteristics of the embodiments may be arbitrarily combined if no conflict is caused.

Embodiment 1

Figure 1:
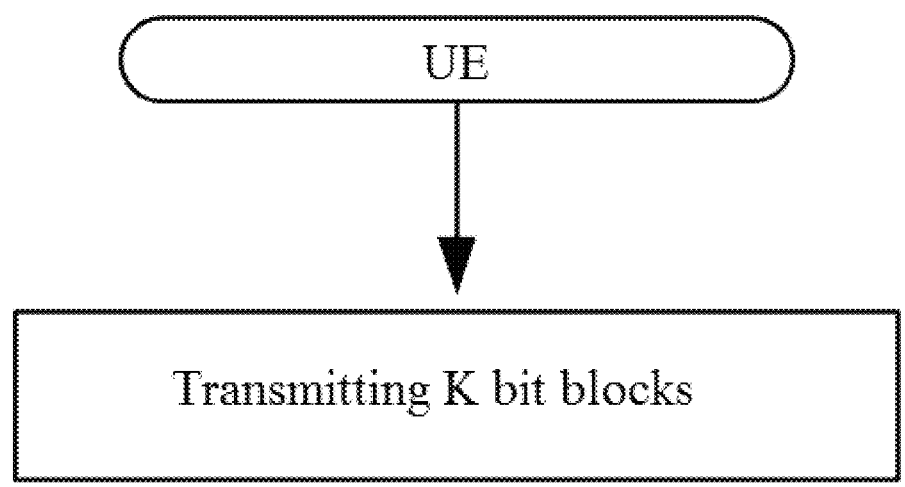
FIG. 1 is a flowchart illustrating the transmission of K bit blocks according to one embodiment of the present disclosure.

Embodiment 1 illustrates an example of a flowchart of the transmission of K bit blocks according to the present disclosure, as shown in FIG. 1. In FIG. 1, each box represents a step. In Embodiment 1, the UE in the present disclosure transmits K bit blocks, wherein if the number of idle bits on a first physical layer channel is not less than Q before the K bit blocks are placed on the first physical layer channel, the K bit blocks are transmitted on the first physical layer channel; otherwise, the K bit blocks are transmitted on K physical layer channels respectively; the K physical layer channels belong to K serving cells respectively, or, the K physical layer channels belong to one serving cell and time-domain resources occupied by any two of the K physical layer channels are orthogonal; the K bit blocks together are used for determining first information; K is a positive integer greater than 1, and Q is equal to the total number of the bits included in the K bit blocks.

In one subembodiment, the K bit blocks are transmitted on a PUCCH.

In one subembodiment, the K bit blocks correspond to K fields in one UCI format respectively.

In one subembodiment, the first physical layer channel is a PUCCH.

In one subembodiment, the K physical layer channels are K PUCCHs.

In one subembodiment, the K bit blocks are transmitted after subjected to uplink control channel coding.

In one subembodiment, the K serving cells correspond to K different scrambling sequences respectively.

In one subembodiment, the K serving cells are on K different subcarriers.

In one subembodiment, the K bit blocks are transmitted on K physical layer channels respectively, and K transmitting beams are used for transmitting the K bit blocks respectively.

In one subembodiment, the K bit blocks are transmitted on K physical layer channels respectively, the K physical layer channels and K reference signals are QCL, and transmitting beams used for transmitting the K reference signals are used for transmitting the K physical layer channels.

In one subembodiment, information bits and idle bits are transmitted on the first physical layer channel, wherein the idle bits refer to the bits not carrying information.

In one subembodiment, before the K bit blocks are placed on the first physical layer channel, the number of idle bits on the first physical layer channel is L, wherein L is a positive integer not less than Q; after the K bit blocks are placed on the first physical layer channel, the number of idle bits on the first physical layer channel is L-Q.

In one subembodiment, the K bit blocks are used for determining a beam recovery request.

In one subembodiment, the K bit blocks are used for determining QCL related information of a subsequent PDCCH.

In one subembodiment, the K bit blocks are used for determining a transmitting beam of a subsequent PDCCH.

In one subembodiment, the K bit blocks are used for determining a first reference signal, and a receiving beam used for the first reference signal is used for receiving a subsequent PDCCH.

In one subembodiment, the K bit blocks are used for determining a first reference signal, and a transmitting beam used for the first reference signal is used for transmitting a subsequent PDCCH.

In one subembodiment, the K bit blocks are used for determining a first reference signal, a subsequent PDCCH and the first reference signal are spatially QCL.

In one subembodiment, the UE determines autonomously to transmit the K bit blocks.

In one subembodiment, the UE receives a target radio signal, and a measurement for the target radio signal is used for triggering the transmission of the K bit blocks.

In one subembodiment, the target radio signal is a reference signal.

Embodiment 2

Figure 2:
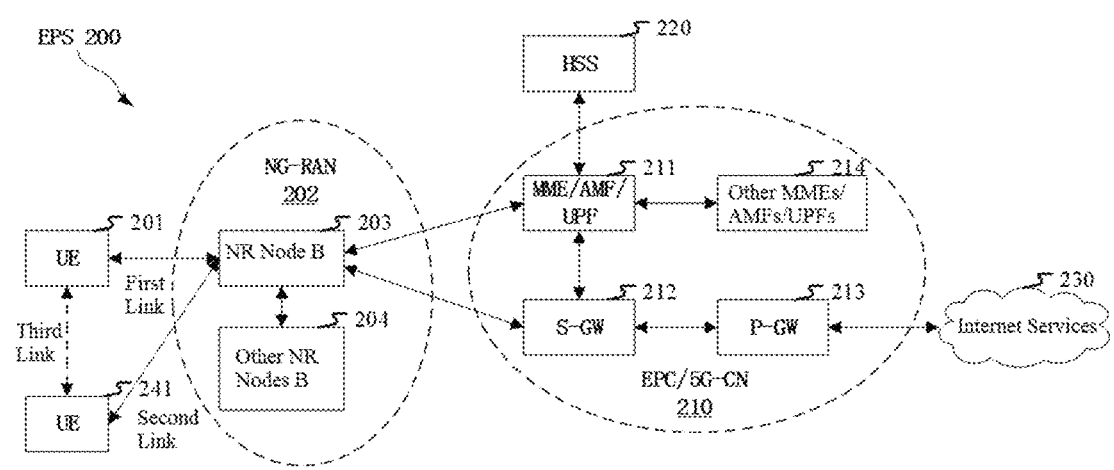
FIG. 2 is a diagram illustrating a network architecture according to one embodiment of the present disclosure.

Embodiment 2 illustrates an example of a diagram of a network architecture according to the present disclosure, as shown in FIG. 2. FIG. 2 is a diagram illustrating a system network architecture 200 of NR 5G Long-Term Evolution (LTE), Long-Term Evolution Advanced (LTE-A). The NR 5G or LTE network architecture 200 may be called an Evolved Packet System (EPS) 200. The EPS 200 may include one or more UEs 201, an NG-RAN 202, an Evolved Packet Core/5G-Core Network (EPC/5G-CN) 210, a Home Subscriber Server (HSS) 220 and an Internet Service 230. Herein, the EPS may be interconnected with other access networks. For simple description, the entities/interfaces are not shown. As shown in FIG. 2, the EPS provides packet switching services. Those skilled in the art are easy to understand that various concepts presented throughout the present disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the EPC/5G-CN 210 via an S1/NG interface. The EPC/5G-CN 210 includes an MME/AMF/UPF 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet Switching Streaming Services (PSSs).

In one subembodiment, the UE 201 corresponds to the UE in the present disclosure.

In one subembodiment, the gNB 203 corresponds to the base station in the present disclosure.

In one subembodiment, the UE 201 supports multi-antenna transmission.

In one subembodiment, the UE 201 supports analog beamforming.

In one subembodiment, the gNB 203 supports multi-antenna transmission.

In one subembodiment, the gNB 203 supports analog beamforming.

Embodiment 3

Figure 3:
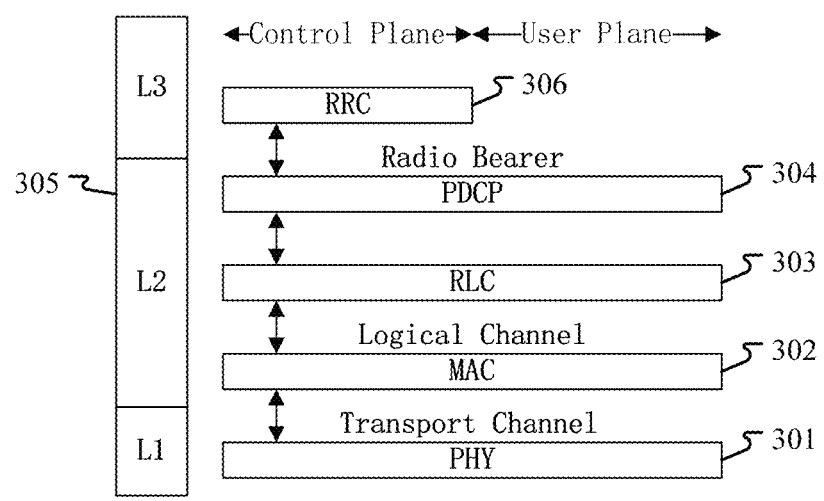
FIG. 3 is a diagram illustrating a radio protocol architecture of a user plane and a control plane according to one embodiment of the present disclosure.

Embodiment 3 is a diagram illustrating an embodiment of a radio protocol architecture of a user plane and a control plane according to the present disclosure, as shown in FIG. 3. FIG. 3 is a diagram illustrating an embodiment of a radio protocol architecture of a user plane and a control plane. In FIG. 3, the radio protocol architecture of a UE and a gNB is represented by three layers, which are a layer 1, a layer 2 and a layer 3 respectively. The layer 1 (L1) 301 is the lowest layer and performs signal processing functions of each PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several higher layers above the L2 305, such as a network layer (i.e. IP layer) terminated at a P-GW of the network side and an application layer terminated at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a lost packet to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using an RRC signaling between the gNB and the UE.

In one subembodiment, the radio protocol architecture in FIG. 3 is applicable to the UE in the present disclosure.

In one subembodiment, the radio protocol architecture in FIG. 3 is applicable to the base station device in the present disclosure.

In one subembodiment, the K bit blocks in the present disclosure are generated by the PHY 301.

In one subembodiment, the target radio signal in the present disclosure is generated by the PHY 301.

In one subembodiment, the first signaling in the present disclosure is generated by the RRC sublayer 306.

In one subembodiment, the second radio signal in the present disclosure is generated by the PHY 301.

In one subembodiment, the second signaling in the present disclosure is generated by the RRC sublayer 306.

Embodiment 4

Figure 4:
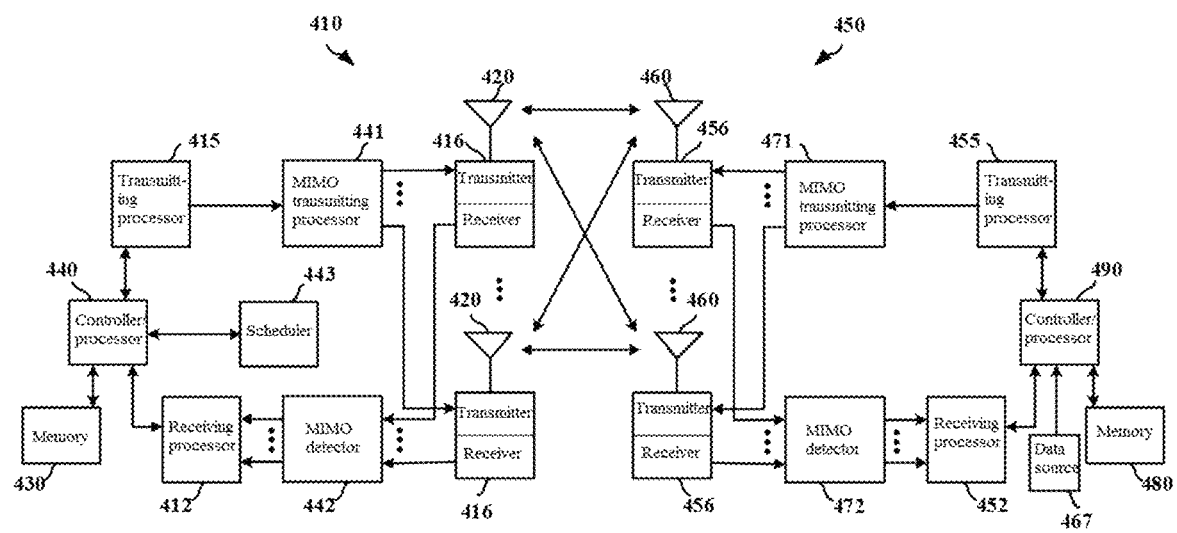
FIG. 4 is a diagram illustrating an evolved node B and a given UE according to one embodiment of the present disclosure.

Embodiment 4 illustrates a diagram of an evolved node B and a given UE according to the present disclosure, as shown in FIG. 4. FIG. 4 is a block diagram of a gNB 410 in communication with a UE 450 in an access network.

The base station device 410 may include a controller/processor 440, a scheduler 443, a memory 430, a receiving processor 412, a transmitting processor 415, an MIMO transmitting processor 441, an MIMO detector 442, a transmitter/receiver 416 and an antenna 420.

The UE 450 may include a controller/processor 490, a memory 480, a data source 467, a transmitting processor 455, a receiving processor 452, an MIMO transmitting processor 471, an MIMO detector 472, a transmitter/receiver 456 and an antenna 460.

In Downlink (DL) transmission, processes relevant to the base station device 410 include the following.

A packet from a higher layer is provided to the controller/processor 440. The controller/processor 440 provides header compression, encryption, packet segmentation and reordering, multiplexing and de-multiplexing between a logical channel and a transport channel, to implement the L2 protocol used for the user plane and the control plane. The packet from a higher layer may include data or control information, for example, Downlink Shared Channel (DL-SCH).

The controller/processor 440 may be connected to the memory 430 that stores program code and data. The memory 430 may be a computer readable medium.

The controller/processor 440 notifies the scheduler 443 of a transmission requirement, the scheduler 443 is configured to schedule an air interface resource corresponding to the transmission requirement and notify the scheduling result to the controller/processor 440.

The transmitting processor 415 receives a bit stream output from the controller/processor 440, and performs signal transmitting processing functions of an L1 layer (that is, PHY), including encoding, interleaving, scrambling, modulation, power control/allocation, generation of physical layer control signaling (including PBCH, PDCCH, PHICH, PCFICH, reference signal), etc.

The MIMO transmitting processor 441 performs spatial processing (for example, precoding, beamforming) on data symbols, control symbols or reference signal symbols, and outputs a baseband signal to the transmitter 416.

The transmitter 416 is configured to convert the baseband signal provided by the MIMO transmitting processor 441 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In DL transmission, processes relevant to the UE 450 include the following.

The receiver 456 is configured to convert a radio-frequency signal received via the antenna 460 into a baseband signal and provide the baseband signal to the MIMO detector 472.

The MIMO detector 472 is configured to perform an MIMO detection on the signal received from the receiver 456, and provide a baseband signal subjected to MIMO detection for the receiving processor 452.

The receiving processor 452 performs signal receiving processing functions of an L1 layer (that is, PHY), including decoding, de-interleaving, descrambling, demodulation, extraction of physical layer control signaling, etc.

The controller/processor 490 receives a bit stream output from the receiving processor 452, and provides header decompression, decryption, packet segmentation and reordering, multiplexing and de-multiplexing between a logical channel and a transport channel, to implement the L2 protocol used for the user plane and the control plane.

The controller/processor 490 may be connected to the memory 480 that stores program code and data. The memory 480 is a computer readable medium.

The first signaling in the present disclosure is generated through the transmitting processor 415 or a packet from a higher layer is provided to the controller/processor 440. The MIMO transmitting processor 441 performs multi-antenna precoding or beamforming processing on a baseband signal related to the first signaling output by the transmitting processor 415. The transmitter 416 converts the baseband signal provided by the MIMO transmitting processor 441 into a radio frequency signal and transmits the radio frequency signal via the antenna 420. The receiver 456 converts the radio frequency signal related to the first signaling received via the antenna 460 into a baseband signal and provides the baseband signal to the MIMO detector 472. The MIMO detector 472 performs an MIMO detection on the signal received from the receiver 456. The receiving processor 452 processes the baseband signal output by the MIMO detector 472 to obtain the first signaling or outputs the baseband signal to the controller/processor 440 to obtain the first signaling.

The second signaling in the present disclosure is generated through the transmitting processor 415 or a packet from a higher layer is provided to the controller/processor 440. The MIMO transmitting processor 441 performs multi-antenna precoding or beamforming processing on a baseband signal related to the second signaling output by the transmitting processor 415. The transmitter 416 converts the baseband signal provided by the MIMO transmitting processor 441 into a radio frequency signal and transmits the radio frequency signal via the antenna 420. The receiver 456 converts the radio frequency signal related to the second signaling received via the antenna 460 into a baseband signal and provides the baseband signal to the MIMO detector 472. The MIMO detector 472 performs an MIMO detection on the signal received from the receiver 456. The receiving processor 452 processes the baseband signal output by the MIMO detector 472 to obtain the second signaling or outputs the baseband signal to the controller/processor 440 to obtain the second signaling.

The target radio signal in the present disclosure is a reference signal generated through the transmitting processor 415. The MIMO transmitting processor 441 performs multi-antenna precoding or beamforming processing on the target radio signal output by the transmitting processor 415. The transmitter 416 converts the baseband signal provided by the MIMO transmitting processor 441 into a radio frequency signal and transmits the radio frequency signal via the antenna 420. The receiver 456 converts the radio frequency signal related to the target radio signal received via the antenna 460 into a baseband signal and provides the baseband signal to the MIMO detector 472. The MIMO detector 472 performs an MIMO detection on the signal received from the receiver 456. The receiving processor 452 performs channel measurement based on the prior knowledge of the baseband signal output by the MIMO detector 472 and the target radio signal.

The second radio signal in the present disclosure is generated through the transmitting processor 415. The MIMO transmitting processor 441 performs multi-antenna precoding or beamforming processing on the second radio signal output by the transmitting processor 415. The transmitter 416 converts the baseband signal provided by the MIMO transmitting processor 441 into a radio frequency signal and transmits the radio frequency signal via the antenna 420. The receiver 456 converts the radio frequency signal related to the second radio signal received via the antenna 460 into a baseband signal and provides the baseband signal to the MIMO detector 472. The MIMO detector 472 performs an MIMO detection on the signal received from the receiver 456. The receiving processor 452 processes the baseband signal output by the MIMO detector 472 to obtain the second radio signal.

In UL transmission, processes relevant to the UE 450 include the following.

The data source 467 provides a packet from a higher layer to the controller/processor 490. The controller/processor 490 provides header compression, encryption, packet segmentation and reordering, multiplexing and de-multiplexing between a logical channel and a transport channel, to implement the L2 protocol used for the user plane and the control plane. The packet from a higher layer may include data or control information, for example, Uplink Shared Channel (UL-SCH).

The controller/processor 490 may be connected to the memory 480 that stores program code and data. The memory 480 may be a computer readable medium.

The transmitting processor 455 receives a bit stream output from the controller/processor 490, and performs signal transmitting processing functions of an L1 layer (that is, PHY), including encoding, interleaving, scrambling, modulation, power control/allocation, generation of physical layer control signaling (including PUCCH, Sounding Reference Signal (SRS)), etc.

The MIMO transmitting processor 471 performs spatial processing (for example, precoding, beamforming) on data symbols, control symbols or reference signal symbols, and outputs a baseband signal to the transmitter 456.

The transmitter 456 is configured to convert the baseband signal provided by the MIMO transmitting processor 471 into a radio-frequency signal and transmit the radio-frequency signal via the antenna 460. Each transmitter 416 performs sampling processing on respective input symbol streams to obtain respective sampled signal streams. Each transmitter 456 performs further processing (for example, digital-to-analogue conversion, amplification, filtering, up conversion, etc.) on respective sampled streams to obtain an uplink signal.

In uplink transmission, processes relevant to the base station device 410 include the following.

The receiver 416 is configured to convert a radio-frequency signal received via the antenna 420 into a baseband signal and provide the baseband signal to the MIMO detector 442.

The MIMO detector 442 is configured to perform an MIMO detection on the signal received from the receiver 416, and provide a symbol subjected to MIMO detection for the receiving processor 442.

The receiving processor 412 performs signal receiving processing functions of an L1 layer (that is, PHY), including decoding, de-interleaving, descrambling, demodulation, extraction of physical layer control signaling, etc.

The controller/processor 440 receives a bit stream output from the receiving processor 412, and provides header decompression, decryption, packet segmentation and reordering, multiplexing and de-multiplexing between a logical channel and a transport channel, to implement the L2 protocol used for the user plane and the control plane.

The controller/processor 440 may be connected to the memory 430 that stores program code and data. The memory 430 is a computer readable medium.

The K bit blocks in the present disclosure are generated through the transmitting processor 455. The MIMO transmitting processor 471 performs multi-antenna precoding or beamforming processing on symbols related to the K bit blocks output by the transmitting processor 455. The transmitter 456 converts the baseband signal provided by the MIMO transmitting processor 471 into a radio frequency signal and transmits the radio frequency signal via the antenna 460. The receiver 416 converts the radio frequency signal related to the K bit blocks received via the antenna 420 into a baseband signal and provides the baseband signal to the MIMO detector 442. The MIMO detector 442 performs an MIMO detection on the signal received from the receiver 416. The receiving processor 415 processes the baseband signal output by the MIMO detector 442 to obtain the K bit blocks.

The judgment in the present disclosure whether the number of idle bits on the first physical layer channel is less than Q before the K bit blocks are placed on the first physical layer channel is conducted in the transmitting processor 455, and the judgment is one part of the function of the transmitting processor 455.

In one subembodiment, the UE 450 device includes at least one processor and at least one memory. The at least one memory includes computer program codes. The at least one memory and the computer program codes are configured to be used in collaboration with the at least one processor. The UE 450 device at least transmits K bit blocks, wherein if the number of idle bits on a first physical layer channel is not less than Q before the K bit blocks are placed on the first physical layer channel, the K bit blocks are transmitted on the first physical layer channel; otherwise, the K bit blocks are transmitted on K physical layer channels respectively; the K physical layer channels belong to K serving cells respectively, or, the K physical layer channels belong to one serving cell and time-domain resources occupied by any two of the K physical layer channels are orthogonal; the K bit blocks together are used for determining first information; K is a positive integer greater than 1, and Q is equal to the total number of the bits included in the K bit blocks.

In one subembodiment, the UE 450 includes a memory that stores a computer readable instruction program. The computer readable instruction program generates an action when executed by at least one processor. The action includes transmitting K bit blocks, wherein if the number of idle bits on a first physical layer channel is not less than Q before the K bit blocks are placed on the first physical layer channel, the K bit blocks are transmitted on the first physical layer channel; otherwise, the K bit blocks are transmitted on K physical layer channels respectively; the K physical layer channels belong to K serving cells respectively, or, the K physical layer channels belong to one serving cell and time-domain resources occupied by any two of the K physical layer channels are orthogonal; the K bit blocks together are used for determining first information; K is a positive integer greater than 1, and Q is equal to the total number of the bits included in the K bit blocks.

In one subembodiment, the gNB 410 device includes at least one processor and at least one memory. The at least one memory includes computer program codes. The at least one memory and the computer program codes are configured to be used in collaboration with the at least one processor. The gNB 410 at least receives K bit blocks, wherein if the number of idle bits on a first physical layer channel is not less than Q before K bit blocks are placed on the first physical layer channel, the K bit blocks are received on the first physical layer channel; otherwise, the K bit blocks are received on K physical layer channels respectively; the K physical layer channels belong to K serving cells respectively, or, the K physical layer channels belong to one serving cell and time-domain resources occupied by any two of the K physical layer channels are orthogonal; the K bit blocks together are used for determining first information; K is a positive integer greater than 1, and Q is equal to the total number of the bits included in the K bit blocks.

In one subembodiment, the gNB 410 includes a memory that stores a computer readable instruction program. The computer readable instruction program generates an action when executed by at least one processor. The action includes receiving K bit blocks, wherein if the number of idle bits on a first physical layer channel is not less than Q before K bit blocks are placed on the first physical layer channel, the K bit blocks are received on the first physical layer channel; otherwise, the K bit blocks are received on K physical layer channels respectively; the K physical layer channels belong to K serving cells respectively, or, the K physical layer channels belong to one serving cell and time-domain resources occupied by any two of the K physical layer channels are orthogonal; the K bit blocks together are used for determining first information; K is a positive integer greater than 1, and Q is equal to the total number of the bits included in the K bit blocks.

In one subembodiment, the UE 450 corresponds to the UE in the present disclosure.

In one subembodiment, the gNB 410 corresponds to the base station in the present disclosure.

In one subembodiment, at least the former three of the transmitter 416, the MIMO transmitter 441, the transmitting processor 415, and the controller/processor 440 are used for transmitting the first signaling in the present disclosure.

In one subembodiment, at least the former three of the receiver 456, the MIMO detector 472, the receiving processor 452, and the controller/processor 490 are used for receiving the first signaling in the present disclosure.

In one subembodiment, at least the former three of the transmitter 416, the MIMO transmitter 441, the transmitting processor 415, and the controller/processor 440 are used for transmitting the second signaling in the present disclosure.

In one subembodiment, at least the former three of the receiver 456, the MIMO detector 472, the receiving processor 452, and the controller/processor 490 are used for receiving the second signaling in the present disclosure.

In one subembodiment, the transmitter 416, the MIMO transmitter 441 and the transmitting processor 415 are used for transmitting the target radio signal in the present disclosure.

In one subembodiment, the receiver 456, the MIMO detector 472 and the receiving processor 452 are used for receiving the target radio signal in the present disclosure.

In one subembodiment, the transmitter 416, the MIMO transmitter 441 and the transmitting processor 415 are used for transmitting the second radio signal in the present disclosure.

In one subembodiment, the receiver 456, the MIMO detector 472 and the receiving processor 452 are used for receiving the second radio signal in the present disclosure.

In one subembodiment, the transmitter/receiver 456, the MIMO transmitter 471 and the transmitting processor 455 are used for transmitting the K bit blocks in the present disclosure.

In one subembodiment, the receiver 416, the MIMO detector 442 and the receiving processor 412 are used for receiving the K bit blocks in the present disclosure.

Embodiment 5

Figure 5:
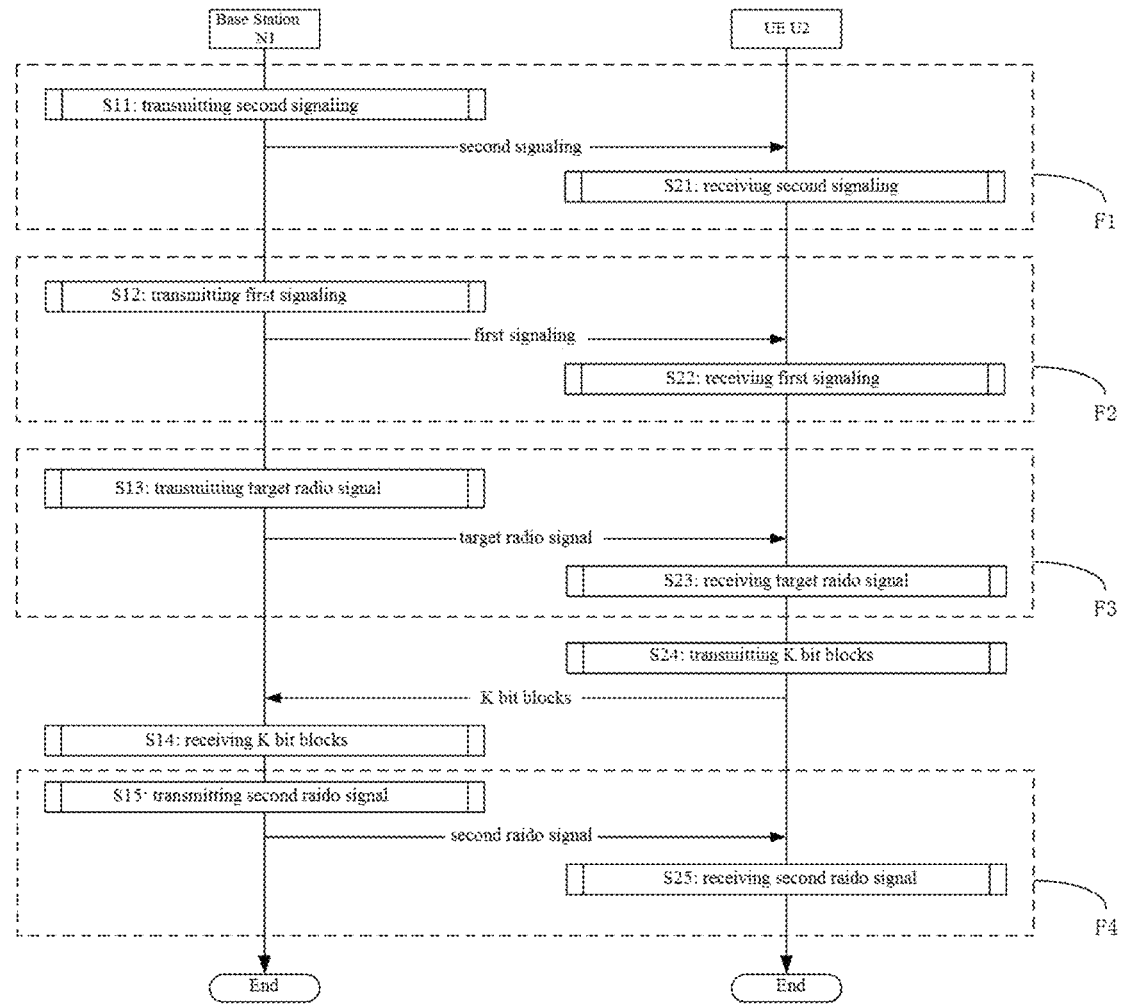
FIG. 5 is a flowchart illustrating the transmission of a radio signal according to one embodiment of the present disclosure.

Embodiment 5 illustrates an example of a flowchart of the transmission of a radio signal according to the present disclosure, as shown in FIG. 5. In FIG. 5, the base station N1 is a maintenance base station for a serving cell of the UE U2. In FIG. 5, steps marked by box F1, box F2, box F3 and box F4 are optional.

The base station N1 transmits a second signaling in S11, transmits a first signaling in S12, transmits a target radio signal in S13, receives K bit blocks in S14, and transmits a second radio signal in S15.

The UE U2 receives the second signaling in S21, receives the first signaling in S22, receives the target radio signal in S23, transmits the K bit blocks in S24, and receives the second radio signal in S25.

In Embodiment 5, if the number of idle bits on a first physical layer channel is not less than Q before the K bit blocks are placed on the first physical layer channel, the K bit blocks are transmitted on the first physical layer channel; otherwise, the K bit blocks are transmitted on K physical layer channels respectively; the K physical layer channels belong to K serving cells respectively, or, the K physical layer channels belong to one serving cell and time-domain resources occupied by any two of the K physical layer channels are orthogonal; the K bit blocks together are used for determining first information; K is a positive integer greater than 1, and Q is equal to the total number of the bits included in the K bit blocks.

In one subembodiment, the step in box F3 exists, and a measurement for the target radio signal is used for triggering the transmission of the K bit blocks.

In one subembodiment, the K bit blocks are only for K1 serving cells, wherein K1 is a positive integer less than K.

In one subembodiment, a first bit block and a second bit block are used for generating a first radio signal transmitted on a second physical layer channel; the second physical layer channel is one of the K physical layer channels; the second bit block is one of the K bit blocks; and the first bit block is unrelated to the first information.

In one subembodiment, the step in box F2 exists, the first signaling is used for determining P reference signal configurations, and the first information is used for determining a first reference signal configuration from the P reference signal configurations, wherein P is a positive integer greater than 1.

In one subembodiment, the step in box F4 exists, the first information is used for determining a multi-antenna related transmitting of the second radio signal, and the first information is related to a multi-antenna related receiving used for the second radio signal.

In one subembodiment, the step in box F1 exists, the second signaling is used for determining a first time-frequency resource set, and time-frequency resources occupied by the first physical layer channel and the K physical layer channels belong to the first time-frequency resource set.

In the condition that no conflict is caused, the above subembodiments may be arbitrarily combined.

Embodiment 6

Figure 6:
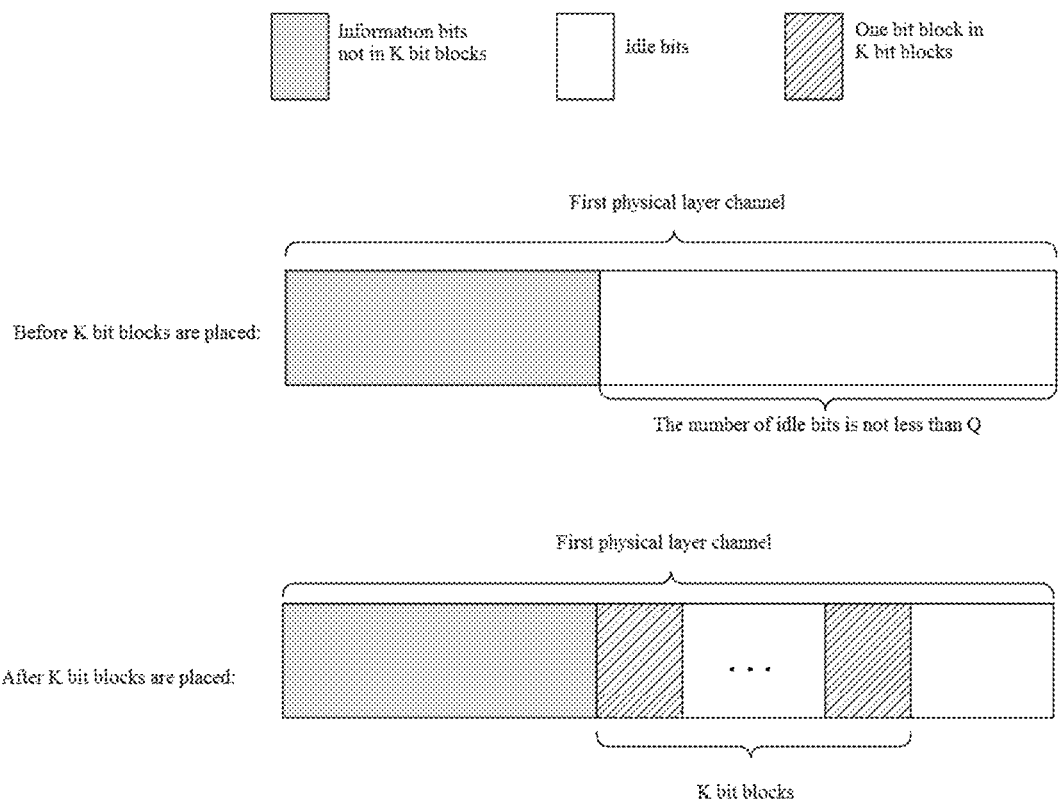
FIG. 6 is a diagram illustrating a first physical layer channel according to one embodiment of the present disclosure.

Embodiment 6 illustrates a first physical layer channel, as shown in FIG. 6. In FIG. 6, the gray rectangle represents information bits not in the K bit blocks, the white rectangle represents idle bits not carrying information, and the rectangle filled by slashes represents one bit block in the K bit blocks.

In Embodiment 6, the total number of the bits included in the K bit blocks is Q, and the total number of the bits that the first physical layer channel is capable of carrying is P. Before the K bit blocks are placed on the first physical layer channel, the total number of the idle bits on the first physical layer channel is L, wherein L is not less than Q. The number of the information bits on the first physical layer channel is P-L. After the K bit blocks are placed on the first physical layer channel, the number of the idle bits on the first physical layer channel is L-Q.

In one subembodiment, the first physical layer channel is a PUCCH.

In one subembodiment, P is the length of a first UCI format corresponding to the first physical layer channel. The number of information bits in the first UCI format other than those determined autonomously by the UE changes according to system configuration.

In one subembodiment, the number of the idle bits in the first physical layer channel changes according to system configuration.

In one subembodiment, there is a first system configuration, under which the number of idle bits on the first physical layer channel is less than Q before the K bit blocks are placed on the first physical layer channel; and there is a second system configuration, under which the number of idle bits on the first physical layer channel is not less than Q before the K bit blocks are placed on the first physical layer channel. The first system configuration and the second system configuration are two different system configurations.

In one subembodiment, the first system configuration and the second system configuration correspond to different numbers of subcarriers respectively.

In one subembodiment, the idle bits refer to the bits not carrying information.

In one subembodiment, the UE determines autonomously whether to transmit the K bit blocks.

In one subembodiment, the K bit blocks are used for determining a beam recovery request.

In one subembodiment, the first physical layer channel is an uplink physical layer channel capable of transmitting control information only, wherein the control information includes at least one of {SR, HARQ/ACK, PMI, CQI, RI, beam recovery request, CRI}.

Embodiment 7

Figure 7:
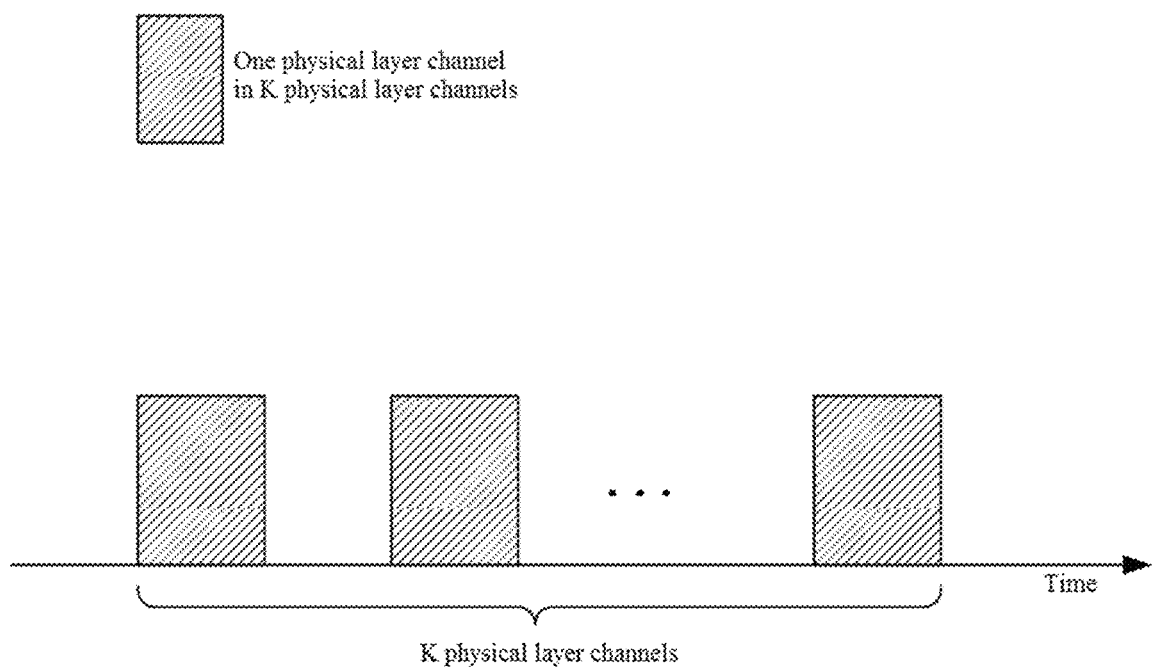
FIG. 7 is a diagram illustrating K physical layer channels belonging to one serving cell according to one embodiment of the present disclosure.

Embodiment 7 illustrates K physical layer channels belonging to one serving cell, as shown in FIG. 7. In FIG. 7, the rectangle filled by slashes represents one bit block in the K bit blocks.

In Embodiment 7, the K physical layer channels are used for transmitting K bit blocks respectively. Time-domain resources occupied by any two of the K physical layer channels are orthogonal. The K physical layer channels belong to one serving cell. The K bit blocks together are used for determining first information.

In one subembodiment, the first information is a beam recovery request.

In one subembodiment, the K physical layer channels are K PUCCHs.

In one subembodiment, the K bit blocks are used for determining a beam recovery request.

In one subembodiment, the K physical layer channels uses a scrambling sequence related to one same cell ID.

In one subembodiment, the K physical layer channels are transmitted in K timeslots respectively.

In one subembodiment, the K timeslots are K consecutive timeslots.

In one subembodiment, the K timeslots are K inconsecutive timeslots.

In one subembodiment, the K physical layer channels are used not only for transmitting the K bit blocks, but also for transmitting information bits other than the K bit blocks.

In one subembodiment, the K physical layer channels are configured by a base station.

In one subembodiment, the transmission of the K bit blocks is determined autonomously by the UE.

Embodiment 8

Figure 8:
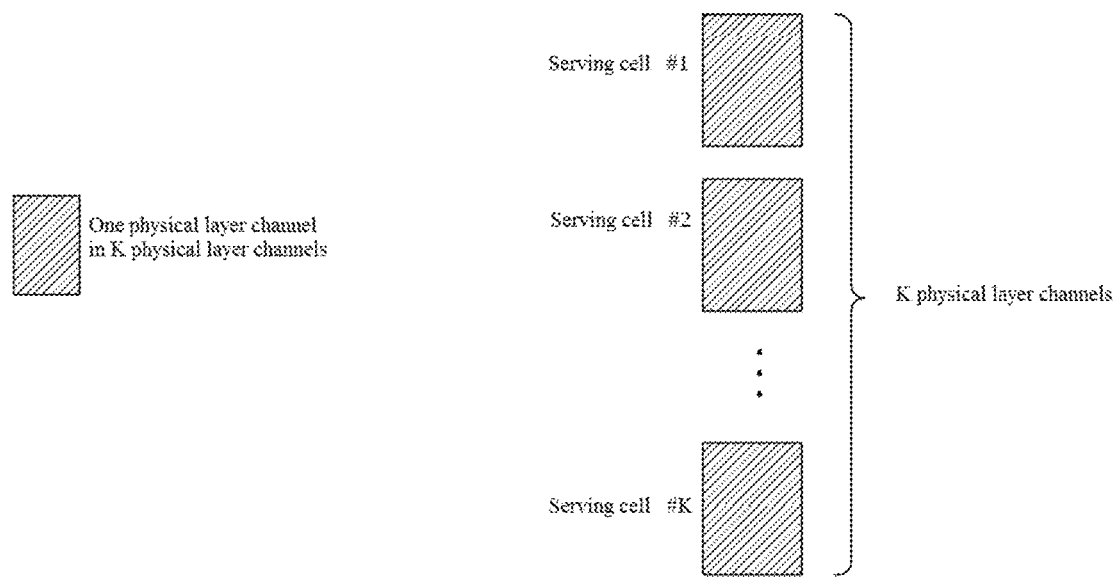
FIG. 8 is a diagram illustrating K physical layer channels belonging to K serving cells respectively according to one embodiment of the present disclosure.

Embodiment 8 illustrates K physical layer channels belonging to K serving cells, as shown in FIG. 8.

In Embodiment 8, the K physical layer channels are used for transmitting K bit blocks respectively. The K physical layer channels belong to K serving cells respectively. The K bit blocks together are used or determining first information.

In one subembodiment, the first information is a beam recovery request.

In one subembodiment, the K bit blocks are for a beam recovery request of one serving cell only.

In one subembodiment, the K physical layer channels are K PUCCHs.

In one subembodiment, the K physical layer channels use K scrambling sequences corresponding to K different cell IDs, respectively.

In one subembodiment, the K serving cells are on different subcarriers.

In one subembodiment, the K physical layer channels are used not only for transmitting the K bit blocks, but also for transmitting information bits other than the K bit blocks.

In one subembodiment, the K physical layer channels are configured by a base station.

In one subembodiment, the transmission of the K bit blocks is determined autonomously by the UE.

Embodiment 9

Figure 9:
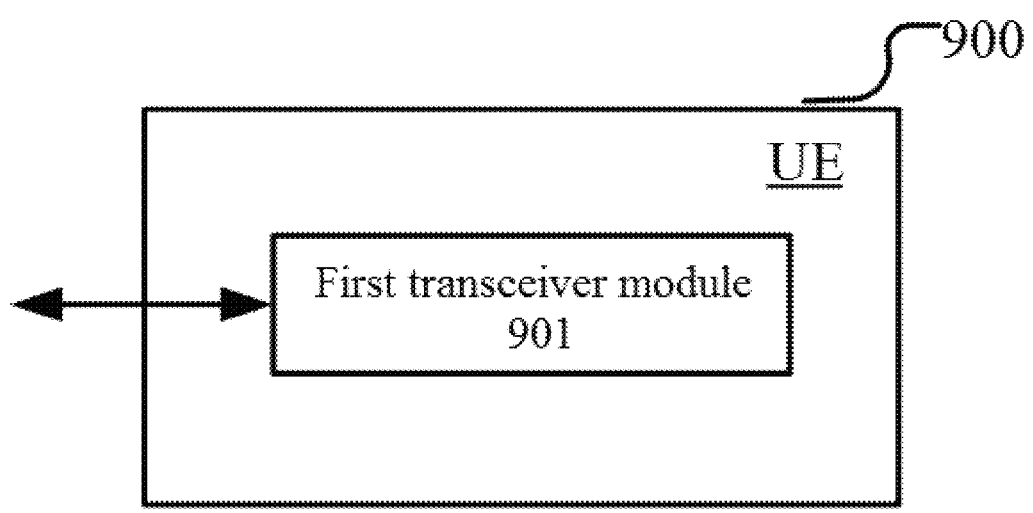
FIG. 9 is a structure block diagram illustrating a processing device in a UE according to one embodiment of the present disclosure.

Embodiment 9 illustrates a structure block diagram of a processing device in a UE, as shown in FIG. 9. In FIG. 9, the processing device 900 in the UE is mainly composed of a first transceiver module 901.

In Embodiment 9, the first transceiver module 901 transmits K bit blocks.

In Embodiment 9, if the number of idle bits on a first physical layer channel is not less than Q before the K bit blocks are placed on the first physical layer channel, the K bit blocks are transmitted on the first physical layer channel; otherwise, the K bit blocks are transmitted on K physical layer channels respectively; the K physical layer channels belong to K serving cells respectively, or, the K physical layer channels belong to one serving cell and time-domain resources occupied by any two of the K physical layer channels are orthogonal; the K bit blocks together are used for determining first information; K is a positive integer greater than 1, and Q is equal to the total number of the bits included in the K bit blocks.

In one subembodiment, the first transceiver module 901 receives a target radio signal, wherein a measurement for the target radio signal is used for triggering the transmission of the K bit blocks.

In one subembodiment, the K bit blocks are only for K1 serving cells, wherein K1 is a positive integer less than K.

In one subembodiment, a first bit block and a second bit block are used for generating a first radio signal transmitted on a second physical layer channel; the second physical layer channel is one of the K physical layer channels; the second bit block is one of the K bit blocks; and the first bit block is unrelated to the first information.

In one subembodiment, the first transceiver module 901 receives a first signaling, wherein the first signaling is used for determining P reference signal configurations, and the first information is used for determining a first reference signal configuration from the P reference signal configurations, wherein P is a positive integer greater than 1.

In one subembodiment, the first transceiver module 901 receives a second radio signal, wherein the first information is used for determining a multi-antenna related transmitting of the second radio signal, and the first information is related to a multi-antenna related receiving used for the second radio signal.

In one subembodiment, the first transceiver module 901 receives a second signaling, wherein the second signaling is used for determining a first time-frequency resource set, and time-frequency resources occupied by the first physical layer channel and the K physical layer channels belong to the first time-frequency resource set.

Embodiment 10

Figure 10:
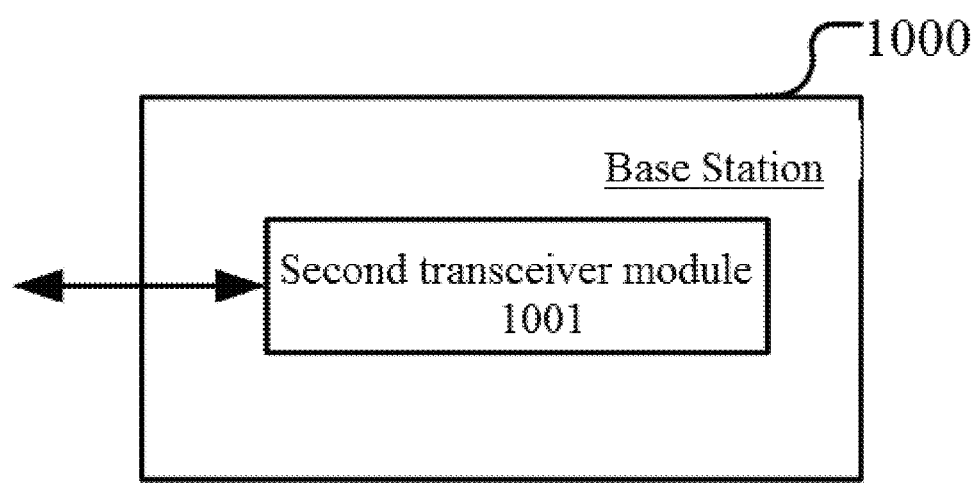
FIG. 10 is a structure block diagram illustrating a processing device in a base station according to one embodiment of the present disclosure.

Embodiment 10 illustrates a structure block diagram of a processing device in a base station, as shown in FIG. 10. In FIG. 10, the processing device 1000 in the base station is mainly composed of a second transceiver module 1001.

In Embodiment 10, the second transceiver module 1001 receives K bit blocks.

In Embodiment 10, if the number of idle bits on a first physical layer channel is not less than Q before K bit blocks are placed on the first physical layer channel, the K bit blocks are received on the first physical layer channel; otherwise, the K bit blocks are received on K physical layer channels respectively; the K physical layer channels belong to K serving cells respectively, or, the K physical layer channels belong to one serving cell and time-domain resources occupied by any two of the K physical layer channels are orthogonal; the K bit blocks together are used for determining first information; K is a positive integer greater than 1, and Q is equal to the total number of the bits included in the K bit blocks.

In one subembodiment, the second transceiver module 1001 transmits a target radio signal, wherein a measurement for the target radio signal is used for triggering the transmission of the K bit blocks.

In one subembodiment, the K bit blocks are only for K1 serving cells, wherein K1 is a positive integer less than K.

In one subembodiment, a first bit block and a second bit block are used for generating a first radio signal transmitted on a second physical layer channel; the second physical layer channel is one of the K physical layer channels; the second bit block is one of the K bit blocks; and the first bit block is unrelated to the first information.

In one subembodiment, the second transceiver module 1001 transmits a first signaling, wherein the first signaling is used for determining P reference signal configurations, and the first information is used for determining a first reference signal configuration from the P reference signal configurations, wherein P is a positive integer greater than 1.

In one subembodiment, the second transceiver module 1001 transmits a second radio signal, wherein the first information is used for determining a multi-antenna related transmitting of the second radio signal, and the first information is related to a multi-antenna related receiving used for the second radio signal.

In one subembodiment, the second transceiver module 1001 transmits a second signaling, wherein the second signaling is used for determining a first time-frequency resource set, and time-frequency resources occupied by the first physical layer channel and the K physical layer channels belong to the first time-frequency resource set.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the present application includes but not limited to macro-cellular base stations, micro-cellular base stations, home base stations, relay base station and radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
    transmitting K bit blocks;
    wherein (i) responsive to determining that a number of idle bits on a first physical layer channel is not less than Q before the K bit blocks are placed on the first physical layer channel, the K bit blocks are transmitted on the first physical layer channel, and (ii) responsive to determining that the number of the idle bits on the first physical layer channel is less than Q before the K bit blocks are placed on the first physical layer channel, the K bit blocks are transmitted on K physical layer channels respectively; the first physical layer channel is scheduled by a serving cell for the reporting of information other than the K bit blocks; the K physical layer channels belong to K serving cells respectively, or, the K physical layer channels belong to one serving cell and time-domain resources occupied by any two of the K physical layer channels are orthogonal; the K bit blocks together are used for determining first information; K is a positive integer greater than 1, and Q is equal to a total number of the bits included in the K bit blocks.

2. The method according to claim 1, comprising:
    receiving a target radio signal;
    wherein a measurement for the target radio signal is used for triggering the transmission of the K bit blocks.

3. The method according to claim 1, wherein the K bit blocks are only for K1 serving cells, wherein K1 is a positive integer less than K.

4. The method according to claim 1, comprising:
    receiving a first signaling;

wherein the first signaling is used for determining P reference signal configurations, and the first information is used for determining a first reference signal configuration from the P reference signal configurations, wherein P is a positive integer greater than 1.

5. The method according to claim 1, comprising:
receiving a second radio signal;
wherein the first information is used for determining a multi-antenna related transmitting of the second radio signal, and the first information is related to a multi-antenna related receiving used for the second radio signal.

6. A method in a base station device for wireless communication, comprising:
receiving K bit blocks;
wherein (i) responsive to determining that a number of idle bits on a first physical layer channel is not less than Q before K bit blocks are placed on the first physical layer channel, the K bit blocks are received on the first physical layer channel, and (ii) responsive to determining that the number of the idle bits on the first physical layer channel is less than Q before the K bit blocks are placed on the first physical layer channel, the K bit blocks are received on K physical layer channels respectively; the first physical layer channel is scheduled by a serving cell for the reporting of information other than the K bit blocks; the K physical layer channels belong to K serving cells respectively, or, the K physical layer channels belong to one serving cell and time-domain resources occupied by any two of the K physical layer channels are orthogonal; the K bit blocks together are used for determining first information; K is a positive integer greater than 1, and Q is equal to a total number of the bits included in the K bit blocks.

7. The method according to claim 6, comprising:
transmitting a target radio signal;
wherein a measurement for the target radio signal is used for triggering the transmission of the K bit blocks.

8. The method according to claim 6, wherein the K bit blocks are only for K1 serving cells, wherein K1 is a positive integer less than K.

9. The method according to claim 6, comprising:
transmitting a first signaling;
wherein the first signaling is used for determining P reference signal configurations, and the first information is used for determining a first reference signal configuration from the P reference signal configurations, wherein P is a positive integer greater than 1.

10. The method according to claim 6, comprising:
transmitting a second radio signal;
wherein the first information is used for determining a multi-antenna related transmitting of the second radio signal, and the first information is related to a multi-antenna related receiving used for the second radio signal.

11. A UE for wireless communication, comprising:
a first transceiver module, to transmit K bit blocks;
wherein (i) responsive to determining that a number of idle bits on a first physical layer channel is not less than Q before the K bit blocks being placed on the first physical layer channel, the K bit blocks are transmitted on the first physical layer channel, and (ii) responsive to determining that the number of the idle bits on the first physical layer channel is less than Q before the K bit blocks are placed on the first physical layer channel, the K bit blocks are transmitted on K physical layer channels respectively; the first physical layer channel is scheduled by a serving cell for the reporting of information other than the K bit blocks; the K physical layer channels belong to K serving cells respectively, or, the K physical layer channels belong to one serving cell and time-domain resources occupied by any two of the K physical layer channels are orthogonal; the K bit blocks together are used for determining first information; K is a positive integer greater than 1, and Q is equal to a total number of the bits included in the K bit blocks.

12. The UE according to claim 11, wherein the first transceiver module receives a target radio signal, wherein a measurement for the target radio signal is used for triggering the transmission of the K bit blocks.

13. The UE according to claim 11, wherein the K bit blocks are only for K1 serving cells, wherein K1 is a positive integer less than K.

14. The UE according to claim 11, wherein the first transceiver module receives a first signaling, wherein the first signaling is used for determining P reference signal configurations, and the first information is used for determining a first reference signal configuration from the P reference signal configurations, wherein P is a positive integer greater than 1.

15. The UE according to claim 11, wherein the first transceiver module receives a second radio signal, wherein the first information is used for determining a multi-antenna related transmitting of the second radio signal, and the first information is related to a multi-antenna related receiving used for the second radio signal.

16. A base station device for wireless communication, comprising:
a second transceiver module, to receive K bit blocks;
wherein (i) responsive to determining that a number of idle bits on a first physical layer channel is not less than Q before the K bit blocks being placed on the first physical layer channel, the K bit blocks are received on the first physical layer channel, and (ii) responsive to determining that the number of the idle bits on the first physical layer channel is less than Q before the K bit blocks are placed on the first physical layer channel, the K bit blocks are received on K physical layer channels respectively; the first physical layer channel is scheduled by a serving cell for the reporting of information other than the K bit blocks; the K physical layer channels belong to K serving cells respectively, or, the K physical layer channels belong to one serving cell and time-domain resources occupied by any two of the K physical layer channels are orthogonal; the K bit blocks together are used for determining first information; K is a positive integer greater than 1, and Q is equal to a total number of the bits included in the K bit blocks.

17. The base station device according to claim 16, wherein the second transceiver module transmits a target radio signal, wherein a measurement for the target radio signal is used for triggering the transmission of the K bit blocks.

18. The base station device according to claim 16, wherein the K bit blocks are only for K1 serving cells, wherein K1 is a positive integer less than K.

19. The base station device according to claim 16, wherein the second transceiver module transmits a first signaling, wherein the first signaling is used for determining P reference signal configurations, and the first information is used for determining a first reference signal configuration from the P reference signal configurations, wherein P is a positive integer greater than 1.

20. The base station device according to claim 16, wherein the second transceiver module transmits a second radio signal, wherein the first information is used for determining a multi-antenna related transmitting of the second radio signal, and a first information is related to the multi-antenna related receiving used for the second radio signal.

* * * * *